United States Patent
Grünewald et al.

(10) Patent No.: US 10,137,432 B2
(45) Date of Patent: *Nov. 27, 2018

(54) PROCESS FOR PRODUCING WATER-ABSORBING POLYMER PARTICLES

(71) Applicant: BASF SE, Ludwigshafen (DE)

(72) Inventors: Gerald Grünewald, Ludwigshafen (DE); Rüdiger Funk, Niedernhausen (DE); Matthias Weismantel, Jossgrund (DE); Monte Peterson, Pearland, TX (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,758

(22) Filed: Jan. 5, 2018

(65) Prior Publication Data

US 2018/0154335 A1    Jun. 7, 2018

Related U.S. Application Data

(63) Continuation of application No. 15/037,364, filed as application No. PCT/EP2014/074609 on Nov. 14, 2014, now Pat. No. 10,005,064.

(60) Provisional application No. 61/907,414, filed on Nov. 22, 2013.

(51) Int. Cl.
*B01J 20/30* (2006.01)
*F26B 17/04* (2006.01)
(Continued)

(52) U.S. Cl.
CPC ........... *B01J 20/30* (2013.01); *B01J 20/261* (2013.01); *B01J 20/28016* (2013.01);
(Continued)

(58) Field of Classification Search
CPC . F26B 3/04; F26B 17/04; B65G 17/34; B65G 69/20; C08F 6/24
(Continued)

(56) References Cited

U.S. PATENT DOCUMENTS

| 1,800,432 A | 4/1931 | Buck |
| 3,785,476 A | 1/1974 | Poerink |

(Continued)

FOREIGN PATENT DOCUMENTS

| FR | 2110276 A1 | 6/1972 |
| WO | WO-2010139680 A2 | 12/2010 |

OTHER PUBLICATIONS

Buchholz et al. *Modern Superabsorbent Polymer Technology*, "Commercial Processes for the Manufacture of Superabsorbent Polymers." New York: John Wiley & Sons, Inc., 1998, pp. 71-103.

(Continued)

*Primary Examiner* — Fred M Teskin
(74) *Attorney, Agent, or Firm* — Marshall, Gerstein & Borun LLP

(57) ABSTRACT

The invention relates to a process for producing water-absorbing polymer particles, comprising the steps of: •—processing an aqueous polymer gel from polymerization of a monomer solution or suspension, •—drying the aqueous polymer gel in a conveyer dryer, in particular in a forced air conveyer dryer, wherein •—the conveyer dryer has a circulating conveyer belt and the aqueous polymer gel is conveyed on the circulating conveyer belt, and wherein •—the circulating conveyer belt is formed as a circulating plate conveyer belt, comprising a number of belt plates separated by a hinge line of a hinge assembly and each belt plate having a surface for receiving the aqueous polymer gel, wherein said hinge assembly comprises a knuckle joint (301) with the hinge line in form of a straight hinge line.

21 Claims, 6 Drawing Sheets

(51) Int. Cl.
   *B01J 20/26*   (2006.01)
   *B01J 20/28*   (2006.01)
   *B65G 17/34*   (2006.01)
   *B65G 69/20*   (2006.01)
   *F26B 3/04*    (2006.01)
   *B65G 17/06*   (2006.01)

(52) U.S. Cl.
   CPC ....... *B01J 20/3021* (2013.01); *B01J 20/3078* (2013.01); *B01J 20/3085* (2013.01); *B65G 17/067* (2013.01); *B65G 17/34* (2013.01); *B65G 69/20* (2013.01); *F26B 3/04* (2013.01); *F26B 17/04* (2013.01)

(58) Field of Classification Search
   USPC .................................................... 528/502 R
   See application file for complete search history.

(56) References Cited

U.S. PATENT DOCUMENTS

| | | |
|---|---|---|
| 2004/0200698 A1 | 10/2004 | Weiser et al. |
| 2008/0214749 A1 | 9/2008 | Weismantel et al. |
| 2010/0041549 A1 | 2/2010 | Weismantel et al. |
| 2011/0204288 A1 | 8/2011 | Funk et al. |
| 2012/0048973 A1 | 3/2012 | Stueven et al. |
| 2016/0279605 A1* | 9/2016 | Grunewald ............. F26B 17/04 |

OTHER PUBLICATIONS

International Search Report in international patent application No. PCT/EP2014/074609, dated Apr. 15, 2015.
Perry et al., *Perry's Chemical Engineers' Handbook.* McGraw-Hill Professional, 1999, p. 12-48.

* cited by examiner

PROCESS FOR PRODUCING WATER-ABSORBING POLYMER PARTICLES

CROSS-REFERENCE TO RELATED APPLICATIONS

This is a continuation of U.S. application Ser. No. 15/037,364, filed May 18, 2016, which is the U.S. national phase of International Application No. PCT/EP2014/074609, filed Nov. 14, 2014, which claims the benefit of U.S. Provisional Patent Application No. 61/907,414, filed Nov. 22, 2013, incorporated herein by reference in its entirety.

FIELD OF THE INVENTION

The present invention relates to a process for producing water-absorbing polymer particles, wherein an aqueous polymer gel is dried in a belt dryer, preferably forced-air belt dryer, on a circulating conveyer belt.

BACKGROUND OF THE INVENTION

Water-absorbing polymer particles are used to produce diapers, tampons, sanitary napkins and other hygiene articles, but also as water-retaining agents in market gardening, agriculture or technical engineering or the like applications. The water-absorbing polymer particles are also referred to as "absorbent resins", "superabsorbents", "superabsorbent polymers", "absorbent polymers", "absorbent gelling materials", "hydrophile polymers" or "hydrogels".

A superabsorbing polymer in the state of an aqueous polymer gel is considered to be in a wet state; i.e. still having a considerable water content of the aqueous polymer gel before drying, in particular as outlined below. In this state preferably the aqueous polymer gel can be crosslinked; in particular, except of a residual part, practical totally crosslinked, in particular as outlined below. A superabsorbing polymer in the state of water-absorbing polymer particles is considered to be in the state of after drying; i.e. having a lower residual moisture content of the water-absorbing polymer particles after drying of the aqueous polymer gel, in particular as outlined below. In this state preferably the water-absorbing polymer particles can be postcrosslinked; in particular, except of a residual part, practical totally postcrosslinked, in particular as outlined below. The production of water-absorbing polymer particles is described in the monograph "Modern Superabsorbent Polymer Technology", F. L. Buchholz and A. T. Graham, Wiley-VCH, 1998, pages 71 to 103. The aqueous polymer gels obtained by polymerization are typically dried by means of a forced-air belt dryer. The use of air belt dryers, in particular multistage forced air belt dryers, is proposed, wherein the material being dried is newly distributed on the next conveyer belt in each case (see also in "Perry's Chemical Engineers' Handbook", 7th edition, McGraw-Hill, pages 12-48).

Belt dryers with conveyer belts in general are used for producing water-absorbing polymer particles like e.g. described with regard to specific relevant parameters of a conveyer belt surface roughness in US2011/0204288 A1 or a conveyer belt speed in US 2010/0041549A1 or a swivel belt in combination with a conveyer belt US 2012/0048973A1. Thus, belt dryers with conveyer belts are to be distinguished from band reactors. Wherein a band reactor is for use to produce an aqueous polymer gel from its constituents, a conveyer belt dryer is for use to produce water-absorbing polymer particles from an aqueous polymer gel, in particular to produce from a preferably practical totally crosslinked aqueous polymer gel said water-absorbing polymer particles, in particular postcrosslinked water-absorbing polymer particles.

In a contemporary conveyer belt dryer, a plate conveyer belt design of contemporary art has a pin at a joint between a first and a second belt plate and thus the connection of plates is similar to a piano hinge. A piano hinge of general type e.g. is shown in US2004/0200698A1. Here the problem arises that a gap G, as shown in FIG. 5, at the hinge line between the plates forms an openings which allow passing of particles through the openings or trapping of particles in the openings, which is unwanted. Usually material which has fallen off the belt is not or only disadvantageously recyclable and thus in general has to be considered as waste.

SUMMARY OF THE INVENTION

It is an object of the present invention to provide an improved process for producing water-absorbing polymer particles and an improved method of use of a conveyer dryer in a process for producing water-absorbing polymer particles and an improved conveyer dryer adapted for use in a process for producing water-absorbing polymer particles. It is a further object of the invention to improve drying of aqueous polymer gels, in particular to improve drying of aqueous polymer gels by means of a forced-air belt dryer, in particular also to reduce routine maintenance work and extend the run-time between shut-downs. It is still a further object of the invention to improve efficiency of the process and/or to improve effective use of the components of a conveyer belt. It is another object to avoid waste when using a conveyer belt, in particular to avoid passing of particles through a hinge and/or to avoid trapping of particles at a hinge between neighbouring plates of a plate conveyer belt. A further objective is to improve the process stability by avoiding changes in process conditions e.g. to overcome heat exchanger fouling in the dryer which changes the drying air throughputs etc.

The objective with regard to the process is achieved by the invention with a process for producing water-absorbing polymer particles as claimed in claim 1.

The process according to the invention comprises the steps of:
  processing an aqueous polymer gel from polymerization of a monomer solution or suspension,
  drying the aqueous polymer gel in a conveyer dryer, wherein
    the conveyer dryer has a circulating conveyer belt and the aqueous polymer gel is conveyed on the circulating conveyer belt, and wherein
    the circulating conveyer belt is formed as a circulating plate conveyer belt, comprising a number of belt plates separated by a hinge line of a hinge assembly and each belt plate having a surface for receiving the polymer gel, wherein
said hinge assembly comprises a knuckle joint with the hinge line in form of a straight hinge line.

BRIEF DESCRIPTION OF THE DRAWINGS

FIG. 1A, FIG. 1B1, and FIG. 1B2 illustrate the general principle of a conveyor dryer;

DETAILED DESCRIPTION OF THE PREFERRED EMBODIMENTS

Figure 1A:
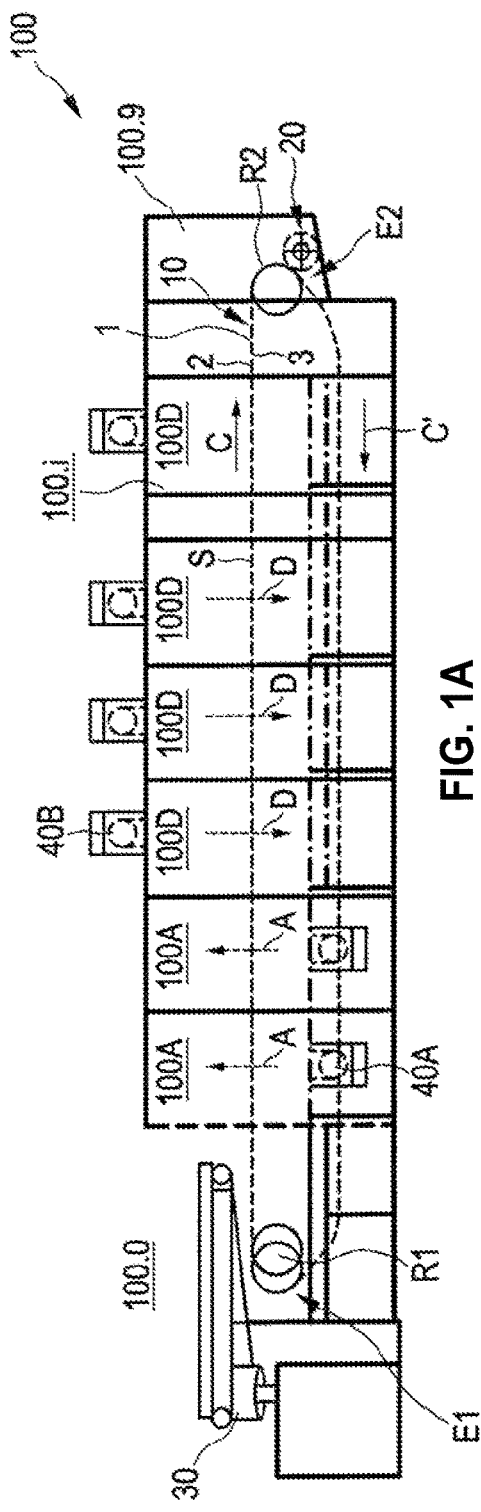

Herein below the circulating conveyer belt in form of the plate conveyer belt of the invention is referred to as a circulating plate conveyer belt.

In particular this process comprises processing a cross-linked aqueous polymer gel from polymerization of a monomer solution or suspension.

The objective with regard to the invention is achieved by a process. The concept of the invention for achieving the objective also leads to a conveyer dryer in a process for producing water-absorbing polymer particles wherein a conveyer dryer is adapted for drying the aqueous polymer gel. According to the invention therein the conveyer dryer has a circulating conveyer belt and the aqueous polymer gel is conveyed on the circulating conveyer belt, and wherein the circulating conveyer belt is formed as a circulating plate conveyer belt, comprising a number of belt plates separated by a hinge line of a hinge assembly and each belt plate having a surface for receiving the polymer gel, wherein said hinge assembly comprises a knuckle joint with the hinge line in form of a straight hinge line.

Forced-air belt dryers suitable for the process and the method according to the invention are described. for example, in the monograph "Modern Superabsorbent Polymer Technology", F. L. Buchholz and A. T. Graham, Wiley-VCH, 1998, pages 89 to 92.

The invention has recognized in particular that a piano hinge type of hinge, due to its open structure, will necessarily let polymer particles, in particular aqueous polymer gel particles and/or water-absorbing polymer particles, pass through in a certain amount; this will cause a certain amount of waste. In particular the invention recognized that usually hinge gaps are larger than the slits of the plates; thus particles fall through more easily through the hinge gaps as the air speed is much lower than through the belt slits. In particular at the end of the dryer, particularly in a discharge region, a cake of dried super absorbent polymers, i.e. generally dried polymer gel, breaks and then a hinge can be filled with particles from the cake into the hinge; so to say particles can be pressed into the hinge by chance. Thus, even more particles can get trapped in an opening of a hinge. Subsequently particles can be released at the front end of the dryer or on the way, in particular if the hinges are opened or moved, e.g. at a catenary system. This in particular can happen at a turning point of the circulating plate conveyer belt at a front and/or end of the dryer. But also the invention has recognized that the whole belt works like a "vibrating sieve" on the belt way from the back to the front, i.e. in particular on the belt way from a discharge stage at the back to a receiving stage at the front; thus the particles are in principle released everywhere even though with different rates. Also an unwanted accumulation of particles in an airflow path, particularly at or in a dryer, will increase. Thus fouling of a heat exchanger and/or a heater or preheater may be increased due to the particles; this may affect at first a recycled airflow path of air but also can affect a direct airflow path of air to the belt dryer.

This problem is at least limited by reducing or avoiding the amount of polymer particles, in particular aqueous polymer gel particles and/or water-absorbing polymer particles, passing through a hinge by said hinge assembly comprising a knuckle joint with the hinge line in form of a straight hinge line. Here the open structure of a piano type hinge is avoided.

A conveyer dryer of the invention according to claim 22 is adapted for drying the aqueous polymer gel, wherein the conveyer dryer has a circulating conveyer belt and the aqueous polymer gel is conveyed on the circulating conveyer belt, and wherein the circulating conveyer belt is formed as a circulating plate conveyer belt, comprising a number of belt plates separated by a hinge line of a hinge assembly and each belt plate having a surface for receiving the polymer gel, wherein said hinge assembly comprises a knuckle joint with the hinge line in form of a straight hinge line.

Herein below the circulating conveyer belt in form of the plate conveyer belt of the invention is referred to as a circulating plate conveyer belt.

Thus in a first aspect the invention recognized that at least a first part of increased production of waste can be reduced due to the conveyer belt knuckle joint design. The inventive use of the inventive conveyer dryer in the claimed process and method is based on the recognition that said hinge assembly comprising a knuckle joint with the hinge line in form of a straight hinge line is of particular advantage for diminishing the amount of waste; i.e. diminishing the amount of water-absorbing polymer particles falling through a knuckle joint with the hinge line. Thus the hinge according to the concept of the invention is designed such that a particle cannot fall through.

These and other aspects of the invention and further developments thereof are further outlined in the dependent claims. Thereby the mentioned advantages of the proposed concept can be improved even more. For each feature of the dependent claims it is claimed independent protection, independent from all other features of the disclosure.

In this sense the circulating plate conveyer belt is formed as an endless belt, namely formed as an endless plate-conveyer-belt. Preferably a plate of the circulating plate conveyer belt needs not be a one-piece plate but still also can be assembled from a number of flat or other shape plate pieces. Preferably a plate of the circulating plate conveyer belt is made from austenitic steel. However, in order to avoid adherence of the gel on the belt plates, the belt plates could be coated with Teflon, PFA, MFA or similar coatings which are known to avoid adherence of sticky products. Furthermore, the plate conveyer belt could be even made of polymers such as PEEK, Teflon, PVC etc. or combinations of these and other materials.

Following the first aspect of the concept of the invention in a particular preferred development the plates are neighbored perpendicular to the conveying direction of the circulating plate conveyer belt and the straight hinge line extends transverse to the conveying direction, in particular vertical, i.e. at a right angle, to the conveying direction, from a first side of a plate to a second opposite side of the plate. This design is advantageously adapted to the direction of conveying in a drying process. The belt plates are preferably formed in one piece extending from a first side of a belt to a second opposite side of the belt but also could be non-continuous; e.g. a plate can consist of several transverse assembled pieces with hinges in the direction of conveying connecting the pieces; i.e. said several transverse assembled pieces could be placed side by side along a direction which is transverse to the conveying direction.

In particular the knuckle joint is formed as a pin less knuckle joint, in particular wherein the straight hinge line is free of line sections into the conveying direction. Preferably this avoids the open structure of a piano type hinge in a particular advantageous way. Preferably the parts of the hinges of two connected belt plates don't overlap horizontally, but vertically.

Preferably the circulating plate conveyer belt, in particular a belt plate thereof, has a multitude of orifices. Advantageously the belt plate can have a number of roundish orifices, like e.g. with a circular contour or an oval contour, or slots, like e.g. with an elongated contour, wherein an orifice or slot allows to pass drying air there through and thus an orifice or slot or the like opening has an opening width which is smaller than a particle size. In particular the opening width of an orifice or slot is considered to be the smallest width of the orifice or slot. E.g. the opening width of an elliptic contour is considered to be the length of the smallest axis. E.g. the opening width of an elongated contour of a slot is considered to be the length of the small side of the slot. Preferably the long side of the slot or the large axis of an elliptic orifice is directed into the transport direction. Thus a loss of polymer material through the plate itself is advantageously avoided. Less preferably (but still possible also) the openings are larger than the particle size but not much; e.g. the opening size may be in the range of a size of particles from a lower end of a particle size distribution. Still preferable is that the opening widths are in the range of or larger than the particles. In particular this is acceptable when referred only to the lower end of the particle distribution. The total free area of the orifices or slots is preferably in the range of 10 to 70%, i.e. the free area as the sum of all openings divided by the total surface of the belt plates is in the range of 10 to 70%. Preferably, transverse to the direction of transport and/or in the direction of transport, a plate of the circulating plate conveyer belt has a multitude of slots or the like openings. Slots or the like longish openings may be arranged in offset rows and having a length of 5 to 50 mm, a width of 0.5 to 5 mm and a ratio of length to width of 2 to 20. Less preferred but still also possibly applicable are round orifices. E.g. roundish orifices or a cross section dimension of a slit can possibly have a diameter between 0.5 to 10 mm. The direction of the slots could be perpendicular to or in the direction of the conveying.

In a particular preferred development of the first aspect the process is improved by means of the design wherein when circulating the plate conveyer belt—in particular upon bending of the plate conveyer belt—, a first and a second belt plate of the plates are pivoted to each other at the hinge line between the first and the second belt plate by means of the hinge assembly assigned to the first and the second belt plate. In this development upon pivoting the first and the second belt plate to each other at the straight hinge line—but also in any other situation when the plates are not pivoted to each other preferably—no bend slit is formed with a direct connection from the outside to the inside of the belt. According to a variant of the invention a bend slit in a bend region is formed having a slit width wherein the slit width is smaller than an opening width of openings in a belt plate itself. This development has recognized that in the case the hinge slit and/or bend slit is smaller than the width of openings in the plates, particles cannot fall through more easily as through the plates. In other words, if an opening at a hinge line would be larger than the openings in the plates (like it is the case in the prior art) then air speed through the hinge openings would be much lower than through the plate openings and thus particles would fall through more easily.

The development recognized that in contemporary plate conveyer belts—e.g. with a piano type hinge line with a back and forth extension—the openings at the hinge line tend to be larger than slits or other orifices in the drying belt, e.g. in order to allow for thermal expansion of the belt plates since the dryer is operated at elevated temperatures. These openings at a hinge gab G (shown as an example of prior art in FIG. 5) between neighboring plates in a contemporary plate conveyer belt can be wider than orifices of a plate. According to the recognition of the development dry polymer, in particular in an air-down stage of the dryer, dried super absorbent polymers or other water-absorbing polymer in aqueous, gel or particle form can pass through the hinge openings. This dried polymer material will accumulate in the drying zone according to the recognition of the development. This problem is avoided by using a closed knuckle joint wherein the development recognized that, although preferred, the hinge line doesn't need to be absolutely closed. Instead it has been recognized that, upon pivoting the first and the second belt plate to each other at the hinge line, it is sufficient to allow the formation of a bend slit at the straight hinge line having a slit width wherein the slit width is smaller than an opening width of orifices in a belt plate.

In short terms, the first and the second belt plate are arranged at a straight hinge line and a hinge slit is formed having a slit width wherein the slit width is smaller than an opening width of openings in a belt plate. Particular preferred is that no gap at a hinge slit at all is formed or open from outside to inside of the hinge; this preferably can be achieved by means of a totally overlapping hinge assembly. In the case a slit is formed still nevertheless a gap of the slit should be closed at least at one end. However, in all cases, even if a gap at the slit is open at both ends, the slit width should be smaller than the width of slots, orifices or the like openings in a belt plate. The upper limit of slit width and/or opening width can be defined with regard to the smallest particle size, or at least with regard to a lower end of particle sizes derived from a particle size distribution. Thus, at least the slit width should be well below a mean lower particle size.

The above preferred arrangement of a hinge with a slit at a hinge line can be achieved totally or at least partially also by providing a cover means to cover a hinge line, in particular to cover a slit at the hinge line. A cover can be preferably provided by an extension means of a belt plate surface, which is extended over a hinge line, in particular over a slit at the hinge line. The cover is situated over the hinge line, in particular over a slit at the hinge line, at least upon flattening of the circulating plate conveyer belt wherein the first and the second belt plate are arranged to form a comparably flat surface. In this elongated situation of a circulating plate conveyer belt, the surface of the circulating plate conveyer belt is rather flat as compared to a curved situation of the circulating plate conveyer belt, when the circulating plate conveyer belt is bent to change direction. But also preferably the cover can be situated over the hinge line, in particular over a slit at the hinge line, upon pivoting the first and the second belt plate to each other at the straight hinge line. In all cases the cover can be situated preferably such that a bend slit is formed having a slit width wherein the bend slit is covered such that a remaining slit width is smaller than an opening width of openings in a belt plate. The cover preferably is rigid and stable, e.g. made of metal or the like plate material. Still also a flexible material can be provided for the cover in a varied development. These and other developments are outlined in more detail below.

In a particular preferred first developed variant of the process, a slit of the straight hinge line is closed or at least partially covered upon bending of the plate conveyer belt in the conveying direction. Thus a closed and/or covered slit of a straight hinge line can be used in a totally or partially closed knuckle joint. Totally overlapping hinges have no slit at all open from outside to inside. Thus, if a slit may be allowed, the slit is covered. A cover can be formed as a flexible cover. In particular an overlapping hinge is designed as totally closed, preferably such that no through-slit is given in the hinge in a flat state and/or not even in a bended state.

In a particular preferred second developed variant of the process a slit is formed such that a slit width remaining upon bending of the circulating plate conveyer belt is at least smaller than a opening width of openings in a belt plate. In particular a slit is allowed upon bending of the circulating plate conveyer belt and the slit is closed when not bending. However, a slit when conveying is not allowing something to fall through at bending. In particular a cover mentioned above additionally can be used to at least partially cover a slit, preferably although a cover actually opens to some extent, wherein preferably the extent is at least smaller than a opening width of openings in a belt plate. A cover can be formed as a flexible cover.

In a particular preferred further developed second variant of the process when circulating the circulating plate conveyer belt, —upon flattening of the circulating plate conveyer belt—in the conveying direction—, the first and the second belt plate are arranged to form a comparably flat surface, in particular a comparably flat surface across the hinge line. In this elongated situation of a circulating plate conveyer belt, the surface of the circulating plate conveyer belt is rather flat as compared to a curved situation of the circulating plate conveyer belt, when the circulating plate conveyer belt is bent to change direction. Therein upon arranging of the first and the second belt plate to form a comparably flat surface, the straight hinge line is closed or covered. Thus, preferably this development provides for a closed knuckle joint upon flattening of the circulating plate conveyer belt. In particular in the bending area of the belt a slit might be allowed, but with smaller width than further slits or round openings in a belt plate.

In a preferred development for achieving the developments mentioned above, it is preferred that the knuckle joint comprises overlapping first and second extensions of the first and second belt plate. In particular two neighboring plates can be coupled to provide a covered hinge. A first and second extension can be provided as top and bottom side elongations of a plate extending over a hinge e.g.

In a preferred development of a knuckle joint the first and second belt plate are pivotal coupled to each other at the hinge line, in particular by means of overlapping first and second extensions of the first and the second belt plate. Preferably a first and a second belt plate are pivotal coupled directly or indirectly to each other at the hinge line. E.g. directly connected first and second plates can be connected by means of a closed hinge assembly at a face side. Indirectly connected first and second plates can be connected by means of a catenary, whereas a hinge can be built as a loose hinge and the catenary connects the plates underneath the plates.

Further developments provide a particularly advantageous construction of the plates and/or of the hinge assembly. Preferably a plate has one or more reinforcing ribs and/or reinforcing trusses. Thereby preferably bending of the plates is avoided and the strength of a plate is improved. Heavy loading of the plates thus is possible without risk or deformation of the plate. The ribs or trusses can be arranged underneath a plate perpendicular to the conveying direction and/or several ribs/trusses can be arranged in the conveying direction. The ribs/trusses can be welded or screwed to be connected with the belt plates.

Advantageously the plate conveyer belt has a traction assembly line in gear with a drive and/or adapted for supporting the plates. In particular a traction assembly line has a number of traction elements wherein the first and/or second plate is assigned to the first one and/or a second one of the traction elements. In particular the traction assembly line is in form of a chain of traction elements. In particular at least one of the traction elements of the number of elements of the traction assembly line provides a first and/or a second connection part connected to a single plate. This kind of construction has been found to be particular stable for supporting the plates and also providing an efficient traction to the plates. E.g. the plates can be screwed and/or welded together and/or to the connection.

In a particular preferred development the first connection part to the plate, in particular a first bar, extends along the conveying direction and/or the second connection part to the plate, in particular a second bar, extends crosswise to the conveying direction. This combination provides for a particular safe support of a circulating plate conveyer belt plate and also provides a directional steady traction force to the plate.

Advantageously a traction assembly line supports a traveling side wall extending along the conveying direction along a belt plate's side. This measure advantageously provides for a material guard on the sides of the plate conveyer belt and can be used as a part of a sealing to avoid air bypassing the belt on one or both sides of the belt plates.

In a second aspect of the invention it has been recognized that at least a second part of the waste is due to the conveyer dryer design. Preferably in the process the conveyer dryer is a forced-air conveyer dryer in form of a multiple-stage belt-dryer comprising more than a single-stage. In particular comprising two, three or more stages can be preferred. In a particular preferred development at least one drying stage of the belt-dryer is an air-down stage, wherein drying-air is passed from an upper region above the circulating plate conveyer belt to a lower region below the circulating plate conveyer belt. The development recognized that in an above-mentioned air-down chamber the application of the invention is of particular preferred use, as an air-down chamber tends to unwantingly urge particles through openings in a hinge. Another reason is, that in an air-down chamber higher air velocities are allowed and therefore are used in a second stage of the dryer. In a first stage, air-up flow is used at slightly lower air speed in order to avoid pressing the still soft gel into the beltplate-slits.

In particular a circulating conveyor belt in form of the circulating plate conveyer belt is assigned to a drying zone, in particular a stage of the conveyer dryer, and wherein the separate circulating plate conveyer belt has a first return end and a second return end wherein the first and/or second return end is located outside of a stage of the drying zone, in particular outside a chamber of the drying stage.

Preferably a hinge can be provided which is adapted to be a self cleaning hinge at the hinge line. It turned out that advantageously polymer material accumulated at the hinge line, if any, will fall off when turning the hinge form below to above the plate conveyer belt.

In a test it has been found that some waste of about 1-5 tons every month is being accumulated at the front of a dryer of contemporary art where in particular a piano hinge conveyer belt turns upwards to receive new gel material. The reason is that during the drying process, some gel particles get underneath the upper belt of the piano hinge conveyer belt and stay on the lower return belt of the piano hinge conveyer belt. As the belt turns up from the bottom of the dryer to the top, the particles move by gravity on the lower return part of the belt and are finally fall through the belt slits. Secondly the hinge of the belt in the art opens up some, but not too much. Particles, that got stuck in the hinge line e.g. at the discharge side of the dryer are now being released and can fall down onto the floor. Thereby cleaning of a conveyer belt is effected.

Thus, in a particular preferred development of a conveyer dryer according to the concept of the invention advantageously a first return end and/or a second return end of the circulating plate conveyer belt is located outside a drying zone's housing, in particular outside a stages housing. Thus, waste can be taken from the conveyer dryer without increased effort, in particular without the need to open a drying stage's housing and without stopping the dryer and thus the continuous production process. Furthermore, there are no heat exchangers, which can be blocked by particles and the drying process and process stability itself is not affected by this accumulation of particles.

It is advantageous in the process according to the invention to use a forced-air belt dryer with a circulating plate conveyer belt and product-contacting surfaces made from stainless steel. It is possible here forth a roughness Rz to be adjusted to the desired value by an appropriate surface treatment, for example by sand-blasting. Sand-blasted steel surfaces have a greater roughness Rz than matt or polished steel surfaces. It may be advantageous to use a rough surface and/or a very polished surface in order to avoid gel sticking to the belt plates. Furthermore, coatings can be used (see above).

Stainless steels typically have a chromium content of 10.5 to 13% by weight. The high chromium content leads to a protective passivation layer of chromium dioxide on the steel surface. Further alloy constituents increase the corrosion resistance and improve the mechanical properties.

Particularly suitable steels are austenitic steels with, for example, at least 0.08% by weight of carbon. The austenitic steels advantageously comprise further alloy constituents, preferably niobium or titanium, in addition to iron, carbon, chromium, nickel and optionally molybdenum.

The preferred stainless steels are steels with materials number 1.43xx or 1.45xx according to DIN EN 10020, where xx may be a natural number from 0 to 99. Particularly preferred materials are the steels with materials numbers 1.4301, 1.4541 and 1.4571, especially steel with materials number 1.4301.

The circulating plate conveyer belt typically has a multitude of orifices or other openings. The openings may be formed as round or elliptical holes e.g. In a preferred embodiment of the present invention, the circulating conveyer belt has—preferably transverse to and/or in the direction of transport—, a multitude of slots arranged in offset rows and having a length of preferably 5 to 50 mm, more preferably 10 to 40 mm, most preferably 15 to 30 mm, a width of preferably 0.5 to 5 mm, more preferably 1 to 4 mm, most preferably 1.5 to 3 mm, and a ratio of length to width of preferably 2 to 20, more preferably 5 to 15, most preferably 8 to 12.

The preferably circulating plate conveyer belt, i.e. the plate conveyer belt of the belt dryer, preferably has a width of at least 1 m. The width of the forced-air belt of the circulating plate conveyer belt, in particular this is with regard to the belt plate, i.e. the width of the circulating plate conveyer belt in a forced-air belt drier, is preferably from 1 to 10 m, more preferably from 2 to 7.5 m, most preferably from 2.5 to 5 m.

The length of the forced-air belt dryer from back to front is preferably from 10 to 80 m, more preferably from 20 to 60 m, most preferably from 30 to 50 m. Thus a circulating plate conveyer belt has a total length which is basically double or more than double the length of the forced-air belt dryer, i.e. upper length in conveying direction, lower length contra conveying direction and curved lengths at back and front. The total length of the circulating plate conveyer belt is preferably from 20 to 160 m, more preferably from 40 to 120 m, most preferably from 60 to 100 m.

The circulating plate conveyer belt speed of the forced-air belt dryer is preferably from 0.005 to 0.05 m/s, more preferably from 0.01 to 0.04 m/s, most preferably from 0.015 to 0.035 m/s.

The residence time on the forced-air belt dryer is preferably from 10 to 120 minutes. More preferably the residence time is from 20 to 90 minutes, most preferably from 30 to 60 minutes. Also preferably the residence time is from 10 to 60 minutes, most preferably from 12 to 30 minutes, in particular from 15 to 25 minutes.

A water content of the aqueous polymer gel before drying in the forced-air belt dryer is preferably from 30 to 70% by weight. In particular in the process a moisture content of the superabsorbent polymer after the drying in the forced-air belt dryer, i.e. in particular a moisture content of the superabsorbent, i.e. water-absorbing, polymer particles, is from 0.5 to 15% by weight. The water content of the aqueous polymer gel, which is provided as a aqueous polymer gel bed, in the application zone, before drying is preferably from 30 to 70% by weight, more preferably from 35 to 65% by weight, most preferably from 40 to 60% by weight. The mean gel particle size diameter of the aqueous polymer gel—that is to say the mean particle size diameter of the aqueous polymer gel particles—is preferably from 0.1 to 10 mm, more preferably from 0.5 to 5 mm, most preferably from 1 to 3 mm.

The height of the polymer gel bed on the conveyer belt of the forced-air belt dryer in the application zone is preferably from 2 to 20 cm, more preferably from 5 to 15 cm, most preferably from 8 to 12 cm.

The gas inlet temperatures of the forced-air belt dryer are preferably from 150 to 220° C., more preferably from 160 to 210° C., most preferably from 170° C. to 200° C.; the temperature may depend and vary on the detailed layout and position in a drying stage of a belt dryer.

The gas stream used for drying may comprise water vapor. However, the water vapor content should not exceed a value that corresponds to a dew point of preferably at most 50° C., more preferably at most 40° C., most preferably at most 30° C.

The moisture content of the superabsorbent polymer after the drying on the forced-air belt dryer is preferably from 0.5 to 15% by weight, more preferably from 1 to 10% by weight, most preferably from 2 to 8% by weight. For determining the above mentioned moisture content, the superabsorbent polymer after drying is analyzed and the moisture content is preferably determined according to EDANA test method WSP 230.2-05, title "Mass Loss Upon Heating".

In a third aspect a development of the invention recognized that the design of the conveyer joint and/or the conveyer dryer is of particular use in a specific process of polymer gel processing. A particularly advantageous drying process is described in WO 2006/100300 A1.

According to a preferred development the aqueous polymer gel is processed from the polymerization of a monomer solution or suspension, the monomer solution or suspension comprising:
 at least one ethylenically unsaturated monomer, in particular bearing acid groups, preferably being at least partly neutralized;
 at least one crosslinker;
 at least one initiator;
 optionally one or more ethylenically unsaturated monomers copolymerizable with the monomers mentioned under (a) and
 optionally one or more water soluble polymers.

In this state the aqueous polymer gel is practically totally crosslinked; in particular crosslinked to an amount of at least 99%.

In particular the process further comprises the steps of:
 drying the resulting aqueous polymer gel on a forced-air belt dryer grinding and classifying the resulting polymer gel, in particular after the drying,
 optionally thermally surface postcrosslinking,
 optionally handling water-absorbing polymer particles in intermediate vessels of silos or stations or the like.

The forced-air belt dryer has a circulating plate conveyer belt according to the concept of the invention. In this state the water-absorbing polymer particles are postcrosslinked; in particular postcrosslinked to an amount of at least 90%.

The production of the water-absorbing polymer particles is described in more detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether. The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinonemonomethylether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allylmethacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/115830 A1 and WO 2002/032962 A2.

Preferred crosslinkers b) are pentaerythrityl triallylether, tetraallyloxyethane, methylenebismethacrylamide, 15-tuply ethoxylated trimethylolpropanetriacrylate, polyethyleneglycol diacrylate, trimethylolpropane triacrylate and triallylamine.

Very particularly preferred crosslinkers b) are the polyethoxylated and/or propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 g/cm² (AUL0.3 psi) passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfatelhydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany). Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the aqueous polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms an aqueous polymer gel which has to be comminuted in a further process step, for example in an extruder or kneader.

To improve the drying properties, the comminuted aqueous polymer gel obtained by means of a kneader can additionally be extruded.

The acid groups of the resulting aqueous polymer gels have typically been partially neutralized. Neutralization is preferably carried out at the monomer stage. This is typically accomplished by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the aqueous polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the aqueous polymer gel stage. When the aqueous polymer gel is neutralized at least partly after the polymerization, the aqueous polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The aqueous polymer gel is then dried with a forced-air belt dryer until the residual moisture content is preferably 0.5 to 15% by weight, more preferably 1 to 10% by weight and most preferably 2 to 8% by weight, the residual moisture content being determined by EDANA recommended test method No. WSP 230.2-05 "Moisture Content". In the case of a too high residual moisture content, the dried polymer gel has a too low glass transition temperature Tg and can be processed further only with difficulty. In the case of a too low residual moisture content, the dried polymer gel is too brittle and, in the subsequent combination steps, undesirably large amounts of polymer particles, in particular water-absorbing polymer particles, with an excessively low particle size are obtained ("fines"). The solids content of the gel before the drying is preferably from 25 to 90% by weight, more preferably from 35 to 70% by weight and most preferably from 40 to 60% by weight.

Thereafter, the dried polymer gel is ground and classified, and the apparatus used for grinding may typically be single- or multistage roller mills, preferably two- or three-stage roller mills, pin mills, hammer mills or vibratory mills.

The mean particle size of the polymer particles, in particular water-absorbing polymer particles, removed as the product fraction is preferably at least 150 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles, in particular water-absorbing polymer particles, with a too small particle size lower the permeability (SFC). The proportion of excessively small polymer particles, in particular water-absorbing polymer particles, ("fines") should therefore be small.

Excessively small polymer particles, in particular excessively small water-absorbing polymer particles, are therefore typically removed and recycled into the process. This is preferably done before, during or immediately after the polymerization, i.e. before the drying of the aqueous polymer gel. The excessively small polymer particles, in particular excessively small water-absorbing polymer particles, can be moistened with water and/or aqueous surfactant before or during the recycling.

It is also possible to remove excessively small polymer particles, in particular excessively small water-absorbing polymer particles, in later process steps, for example after the surface postcrosslinking or another coating step. In this case, the excessively small polymer particles, in particular excessively small water-absorbing polymer particles, recycled are surface postcrosslinked or coated in another way, for example with fumed silica.

When a kneading reactor is used for polymerization, the excessively small polymer particles, in particular excessively small water-absorbing polymer particles, are preferably added during the second last third and/or last third of the polymerization.

When the excessively small polymer particles, in particular excessively small water-absorbing polymer particles, are added at a very early stage, for example actually to the monomer solution, this lowers the centrifuge retention capacity (CRC) of the resulting water-absorbing polymer particles. However, this can be compensated, for example, by adjusting the amount of crosslinker b) used.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles, in particular water-absorbing polymer particles, with too great a particle size lower the swelling rate and/or swelling speed respectively swelling kinetic. The proportion of excessively large polymer particles, in particular excessively large water-absorbing polymer particles, should therefore likewise be small.

Excessively large polymer particles, in particular excessively large water-absorbing polymer particles, are therefore typically removed and recycled into the grinding step of the dried polymer gel.

To further improve the properties, the polymer particles, in particular water-absorbing polymer particles, may be surface postcrosslinked. Suitable surface postcrosslinkers are compounds which comprise groups which can form covalent bonds with at least two carboxylate groups of the polymer particles, in particular water-absorbing polymer particles. Suitable compounds are, for example, polyfunctional amines, polyfunctional amidoamines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or ß-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl2-oxazolidinone, in DE 198 07 502 A1, bis- and poly-2oxazolidinones in DE 198 07 992 C1, 2-oxotetrahydro-1, 3-oxazine and derivatives thereof in DE 198 54 573 A1, N-acyl2 oxazolidinones in DE 198 54 574 A1, cyclic ureas in DE 10204937 A1, bicyclic amido acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propyleneglycol and 1,4-butanediol.

Very particularly preferred surface postcrosslinkers are 2-hydroxyethyl-2-oxazolidinone, 2-oxazolidinone and 1,3-propanediol. In addition, it is also possible to use surface postcrosslinkers which comprise additional polymerizable ethylenically unsaturated groups, as described in DE 37 13 601 A1. The amount of surface postcrosslinker is preferably 0.001 to 2% by weight, more preferably 0.02 to 1% by weight and most preferably 0.05 to 0.2% by weight, based in each case on the dry polymer particles, in particular water-absorbing polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate, citrate and lactate. Aluminum sulfate and aluminum lactate and aluminum acetate are preferred. Apart from metal salts, it is also possible to use polyamines as polyvalent cations.

The amount of polyvalent cation used is, for example, 0.001 to 2% or preferably 1.5% by weight, preferably 0.005 to 1% by weight and more preferably 0.02 to 0.8% by weight, based in each case on the dry polymer particles, in particular water-absorbing polymer particles.

The surface postcrosslinking is typically performed in such a way that a solution of the surface postcrosslinker is sprayed onto the dried polymer particles, in particular water-absorbing polymer particles. After the spraying, the polymer particles, in particular water-absorbing polymer particles, coated with surface postcrosslinker are dried thermally, and the surface postcrosslinking reaction can take place either during or after the drying.

The spraying of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles, in particular water-absorbing polymer particles, can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60. The drying temperature of the water-absorbing polymer particles in the dryer is preferably from 100 to 250° C., more preferably from 130 to 220° C., most preferably from 150 to 200° C. The residence time in the dryer is preferably from 10 to 120 minutes, more preferably from 10 to 90 minutes, most preferably from 30 to 60 minutes. The fill level of the dryer is preferably from 30 to 80%, more preferably from 40 to 75%, most preferably from 50 to 70%. The fill level of the dryer can be adjusted via the height of the overflow weir and rotation speed of the shafts and inclination of the machine.

Subsequently, the surface postcrosslinked water-absorbing polymer particles can be classified again, excessively small and/or excessively large water-absorbing polymer particles being removed and recycled into the process.

To further improve the properties, the surface postcrosslinked water-absorbing polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the water-absorbing polymer particles and reduces their tendency to static charging.

Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles, in particular water-absorbing polymer particles, are, for example, fumed silica, such as Aerosil® 200, and surfactants, such as Span® 20.

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Centrifuge Retention Capacity".

For a more complete understanding of the invention, the invention will now be described in detail with reference to the accompanying drawing. The detailed description will illustrate and describe what is considered as a preferred embodiment of the invention. Of course, it should be understood that various modifications and changes in shape, design or detail could be made without departing from the basic idea of the invention. Therefore, it is intended that the invention may not be limited to the exact form, shape, design and detail shown and described herein, nor to anything less than the whole of the invention disclosed herein and as claimed hereinafter. Furthermore, the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

Figure 1A:
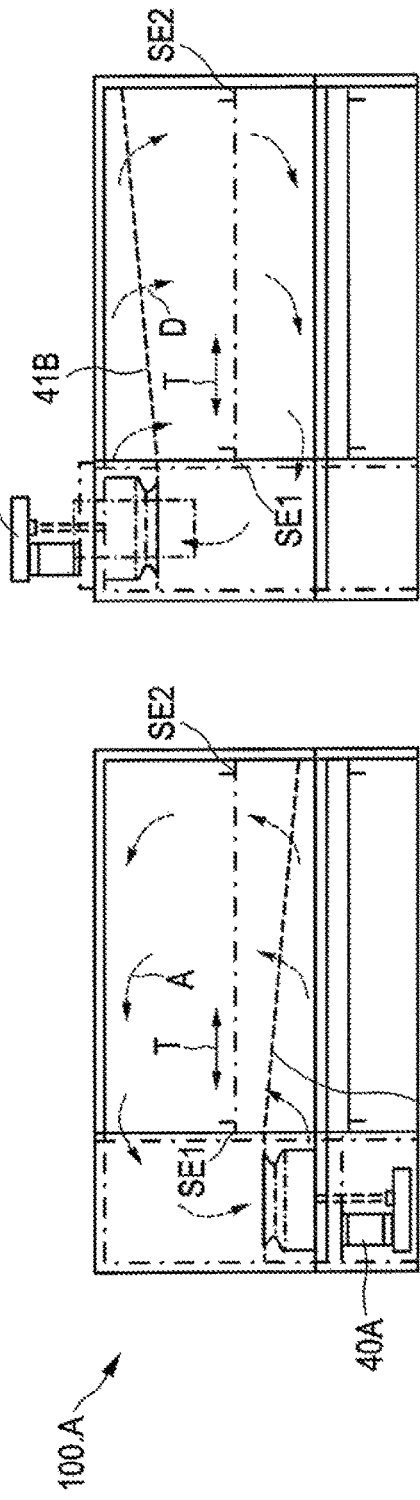
Figures 2A, 2B:
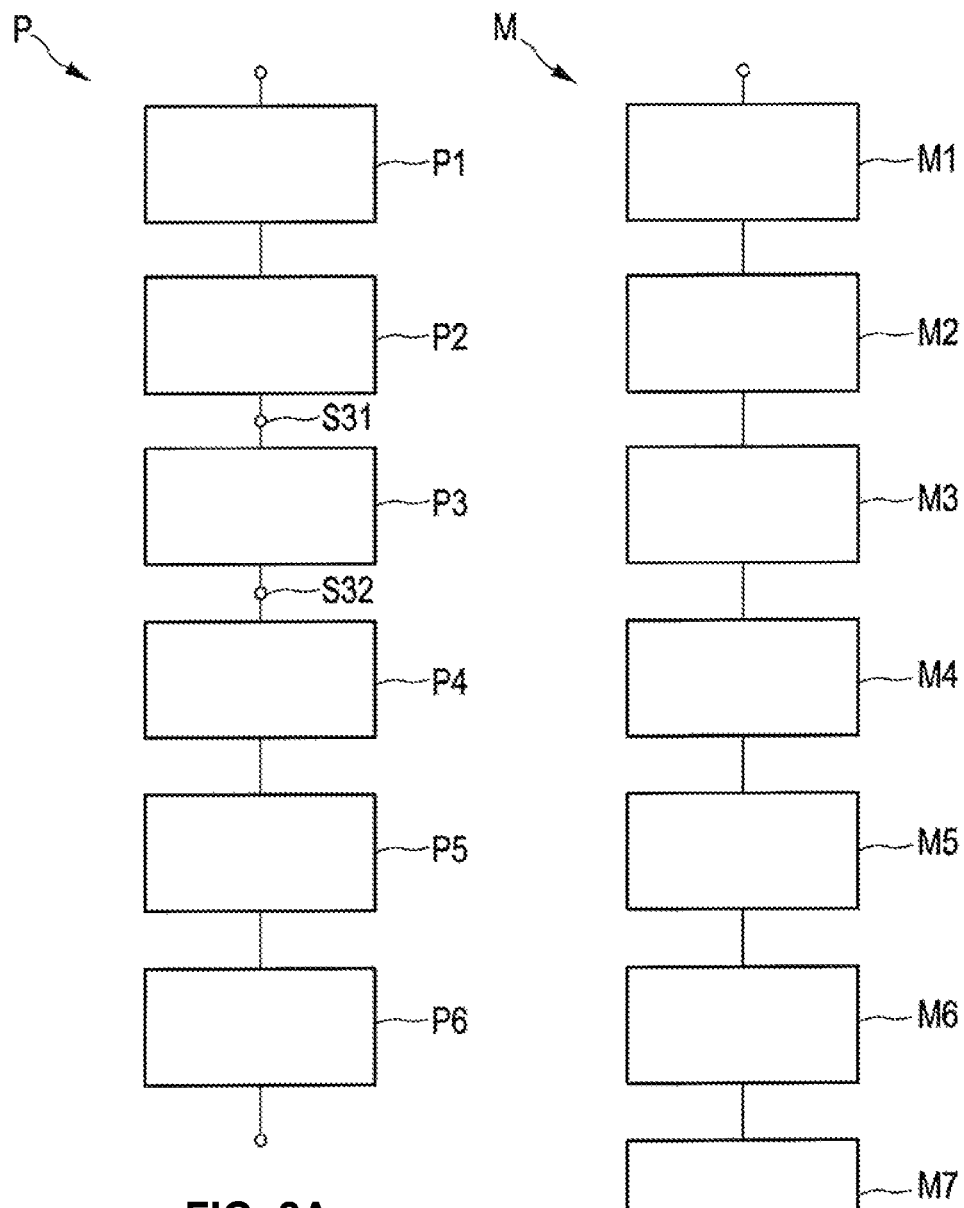
FIG. 2A is a flow chart illustrating the process for producing water-absorbing polymer particles and FIG. 2B a process for drying aqueous water-absorbing polymer gel.
Figure 3A:
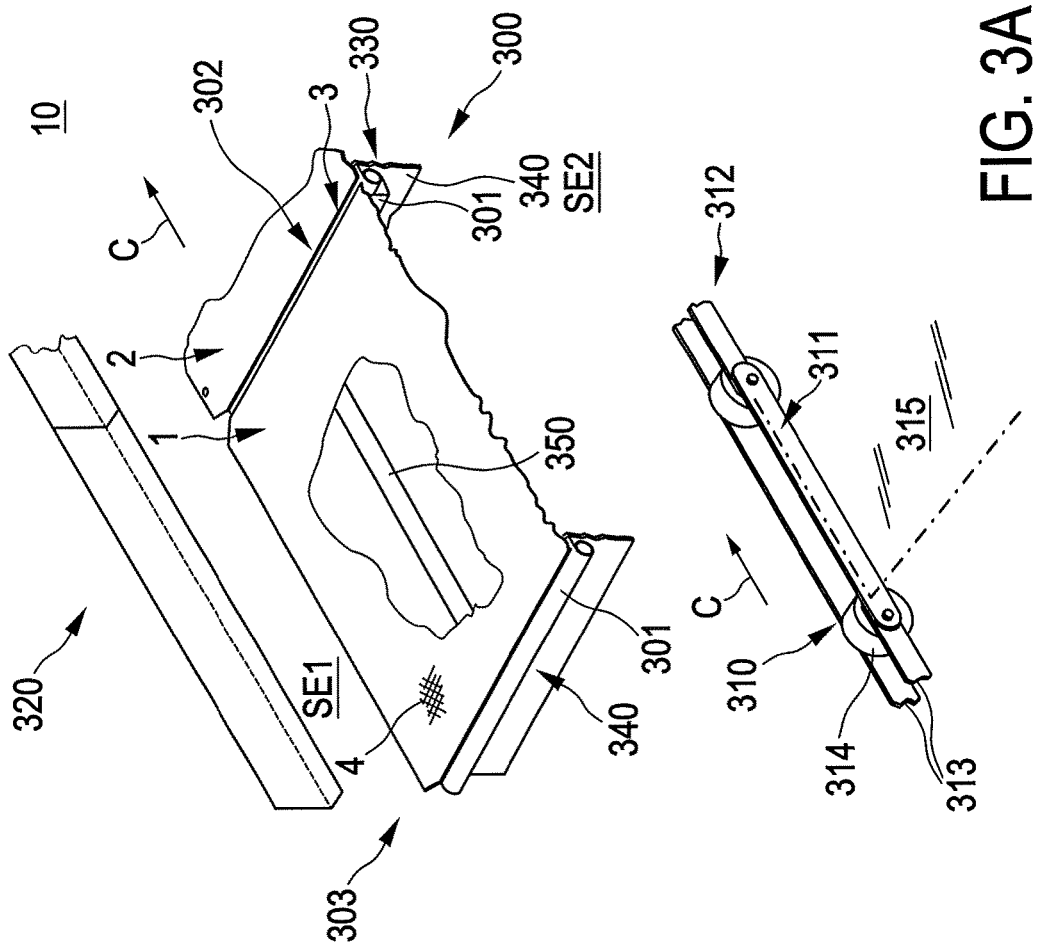
FIG. 3A, FIG. 3B, FIG. 3C, and FIG. 3D are schematics of a hinge assembly at a hinge line between a first and second belt plate.
Figure 4A:
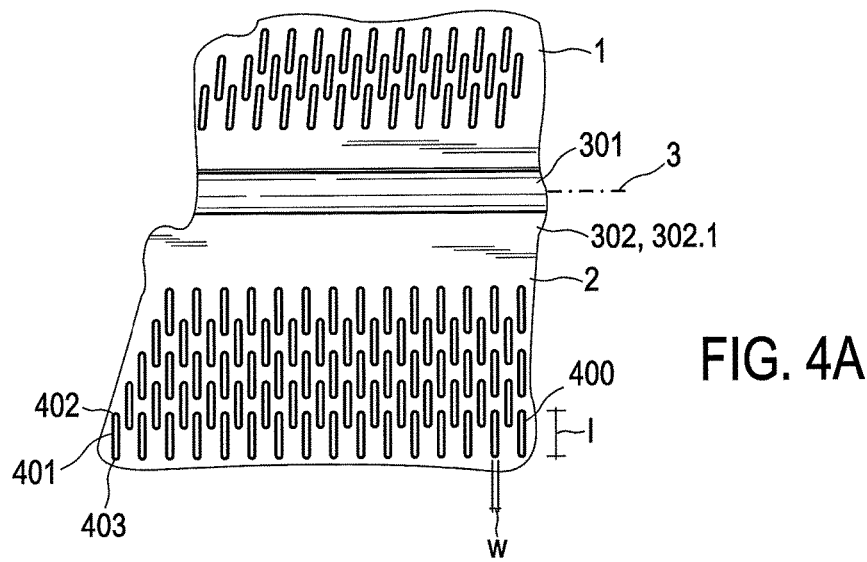
FIG. 4A contains a front perspective view of a first and second plate counter against a conveying direction and FIG. 4B contains a side perspective view of a first and second plate in a relative angle to each other.
Figure 4B:
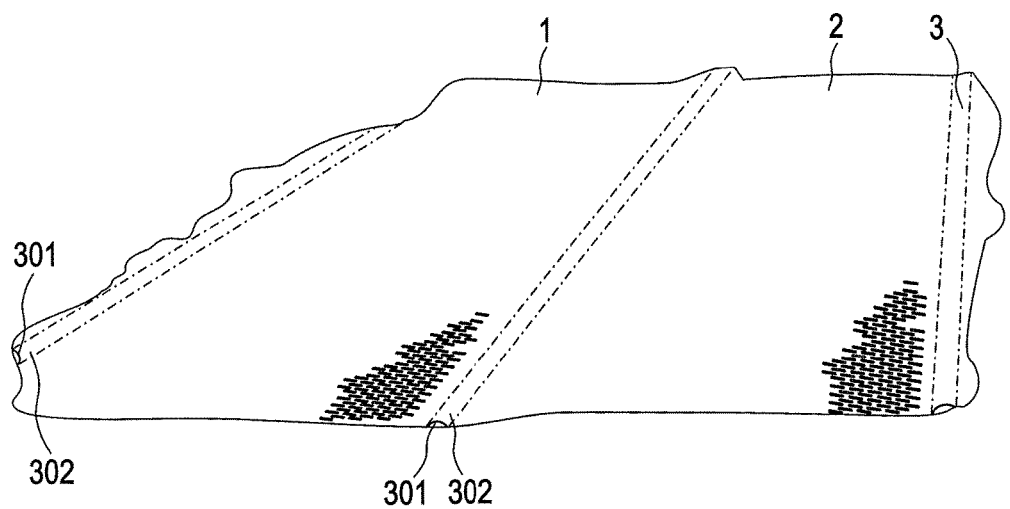
Figure 5:
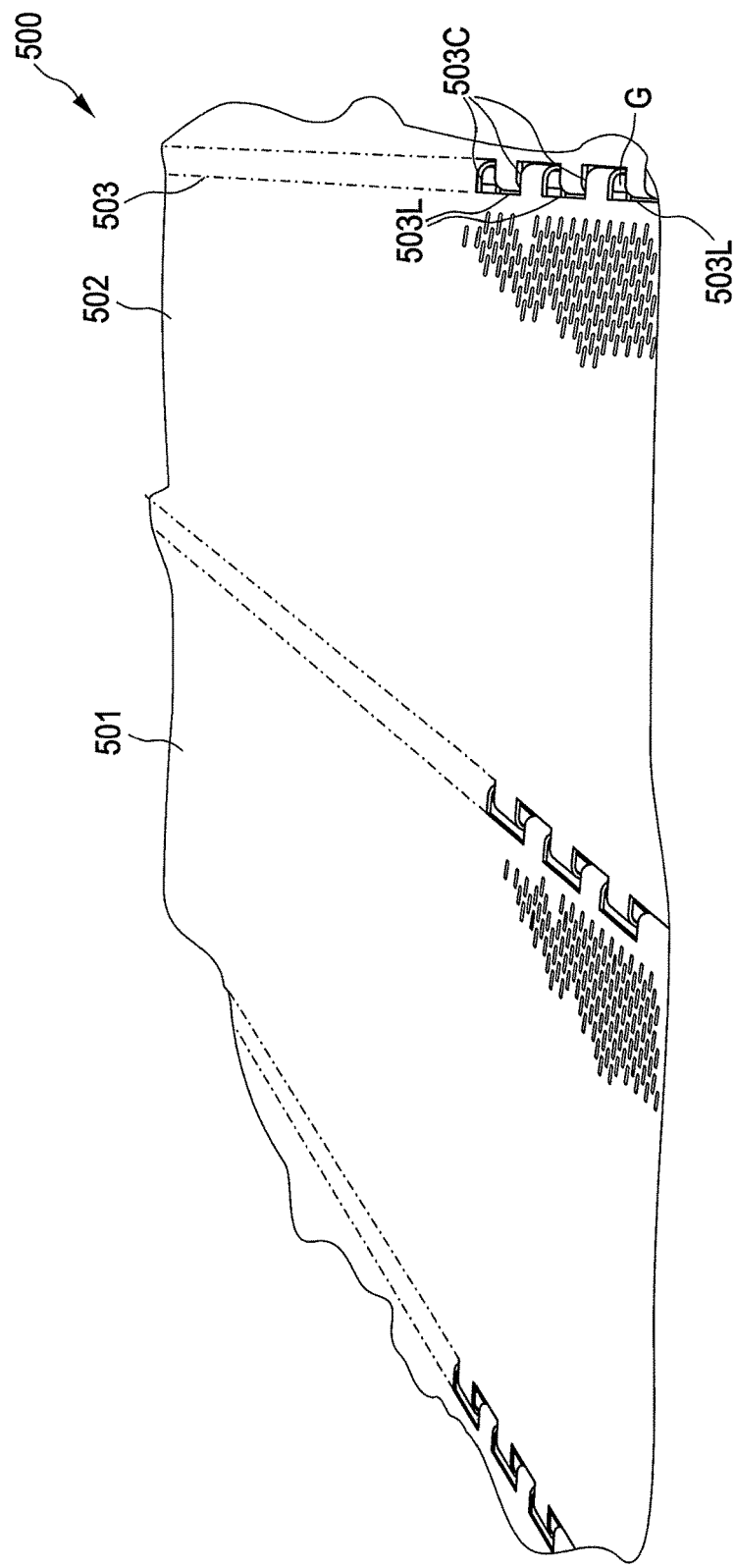
FIG. 5 shows a piano type hinge connection between a first and second plate according to the prior art.

In the drawing:

FIG. 1 shows in view (A) and cross-sectional views (B1) and (B2) a sketch to illustrate the general principle of a conveyer dryer as known in the art, which principle according to the concept of the invention is used with a preferred construction of a conveyer belt in a conveyer dryer in a process for producing water-absorbing polymer particles—;

FIG. 2 shows a flow chart to illustrate a process for producing water-absorbing polymer particles in principle (A) and a process for drying aqueous water-absorbing polymer gel according to a preferred embodiment (B) wherein preferred embodiment of a circulating plate conveyer belt is used, wherein the circulating plate conveyer belt has a hinge assembly comprising a knuckle joint with the hinge line in form of a straight hinge line; in particular as shown in FIG. 3;

FIG. 3 shows in various views A, B C, D schematically a hinge assembly at a hinge line between a first and a second belt plate of a conveyer belt wherein the preferred embodiment of a circulating plate conveyer belt has a hinge assembly comprising a knuckle joint with the hinge line in form of a straight hinge line, for use in a process for drying aqueous water-absorbing polymer gel;

FIG. 4 shows in view (A) a front perspective view of a first and second plate in a counter direction against a conveying direction and in view (B) in a side perspective view of a first and second plate in a relative angle to each other at a second end of a plate conveyer belt;

FIG. 5 shows a piano type hinge connection between a first and second plate according to the prior art.

FIG. 1 shows in principle a single line belt dryer as described in the monograph "modern superabsorbent polymer technology", F. L. Buchholz and A. T. Graham Wiley-VCH, 1998, pages 71 to 103. A single line through-circulation belt dryer 100 as shown in FIG. 1(A) may be understood as a general basis for a basic design of a conveyer dryer. A twoline design or multiline design can be designed wherein two or more of the conveyer dryers 100 are provided in sequential arrangement. At a first end E1 the conveyer dryer 100 provides a receiving stage 100.0 for the aqueous polymer gel and at a second end E2 the conveyer dryer 100 provides a discharge stage 100.9 for the dry polymer. In the receiving stage 100.0 a product distributor 30 distributes an aqueous polymer gel, usually in form of a wet hydrogel, to a plate conveyer belt 10. In this embodiment the product distributer 30 is of the oscillating belt type but may also be of another design. The aqueous polymer gel then is conveyed from the receiving stage 100.0 through a number of drying stages 100.i (i=1 . . . 8 or less or more) to the discharge stage 100.9. As a part of the discharge stage 100.9 a product breaker 20 adapted to break the dried polymer gel into particles of a certain size is provided at the exit.

The conveyer belt is formed as a plate conveyer belt 10 having a number of belt plates wherein herein, as an example, a first and a second neighboring belt plates 1 and 2 are referenced, wherein neighboring belt plates 1, 2 are separated by a hinge line 3 of a hinge assembly. The hinge assembly is further described with regard to embodiments of the invention.

Usually, the wet hydro gel is spread by the product distributor 30 evenly at one end E1 of the conveyer dryer 100 on a continuously perforated, typically stainless steel kind of belt plate of the plate conveyer belt 10. Each belt plate 1, 2 has a surface for receiving the aqueous polymer gel. In this embodiment the belt plates 1, 2 respectively are of a perforated design and made of stainless steel.

The result is a porous bed of wet polymer material across the width of the dryer belt at a desired depth. The width of the dryer belt basically is limited by the width of the plate conveyer belt 10 which extends in the transverse direction T from one side SE1 of the belt 10 to a second side SE2 of the plate conveyer belt 10. FIG. 1(B1) and FIG. 1(B2) each show a cross sectional view of an air-up and an air-down stage 100A, 100D of the drying stages 100.$i$ ($i$=1 ... 8 or less or more) wherein the plate conveyer belt 10 is adapted to convey the aqueous polymer gel through the drying stages 100.$i$ one after the other.

In an air-up stage 100A drying air A approaches the plate conveyer belt 10 from beneath through an airflow distributor plate 41A, then is passed through the plates 1, 2 of the plate conveyer belt 10 and then is circulated back to a heat-exchanger 40A which reheats the air-up circulation air A as shown in FIG. 1(B1). As shown in FIG. 1(B2) in a similar way, an air-down drying stage 100D provides for an air-down circulation air D which is reheated by a heat-exchanger 40B. The air in both zones is forced by a fan 40A and 40B. A fan 40A and 40B may be part of a system of a heat exchangers which are meant to be assigned also with 40A and 40B but which are not shown in detail. A preferred sequence of air-up and air-down stages 100A, 100D are distributed along the longitudinal extension of the conveyer dryer 100 and are assigned to the drying stages 100.$i$ as exemplified in FIG. 1(A). Therein a preferred alteration and/or change in an air-flow is also shown as denoted by the sequence of 100A, 100D, namely up (A)-up (A)-down (D)-down (D)-down (D)-down (D). An alternative is e.g. up-down-up-down-up-down ... and so on; other alternatives are also possible.

The conveying direction C of the plate conveyer belt 10 is defined by the direction of rotation of the rolls R1, R2, which continuously circulate the plate conveyer belt 10 through the receiving stage 100.0, the drying stages 100.$i$ ($i$=1 ... 8 or less or more) and the discharge stage 100.9 and then, upon change of direction, in a counter direction C' way back from the second end E2 (the region of the product breaker 20) to the first end E1 (the region of the product distributor 30). The discharge stage can also be referred to as a cooling stage related to the intention that further heating of the cake of dried water-absorbing polymer particles is avoided respectively a cooling into the direction of ambient temperature is intended.

The particulate polymer material is provided from the product breaker 20 in a particle size of individual pieces of polymer which vary over a certain size range. The characteristics, such as bed porosity, bed bulk density and leakage around the edges of bed of the polymer material, also vary. When dry, the bed of polymer material may consist of individual dry particles or a mass of dry particles stuck together to form a porous sheet, often referred to as cake.

The number of drying stages 100.$i$ ($i$=1 ... 8 or less or more) along the longitudinal extension of the conveyer dryer 100 depend on the specific characteristics of the wet aqueous polymer gel at a receiving stage 100.0 and also on the particular kind of drying air A, D and/or heat circulated up or down by means of the fans 40A, 40B through the polymer material and the plate conveyer belt 10 when moving down the length of the conveyer dryer 100 in the conveying direction C. A particular preferred varied embodiment of a conveyer dryer (not shown here) has at least three stages (i.e. a receiving stage 100.0, a single drying stage 100.1 and a discharge stage) but more preferably at least three drying stages 100.$i$ ($i$=1 ... 3) in addition to a receiving stage 100.0 and a discharge stage.

FIG. 2 (A) shows a flow chart to illustrate a process P for producing water-absorbing polymer particles in principle. In step P1 aqueous polymer gel is processed; basically as described above from the polymerization of a monomer solution or suspension. In this embodiment the monomer solution or suspension comprises:

at least one ethylenically unsaturated monomer, in particular bearing acid groups, preferably being at least partly neutralized;
at least one crosslinker;
at least one initiator;
optionally one or more ethylenically unsaturated monomers copolymerizable with the monomers mentioned under (a) and
optionally one or more water soluble polymers.

In a principle second step P2 the aqueous polymer gel, processed in step P1, is provided to a conveyer arrangement and in a step P3 to a conveyer dryer, wherein the aqueous polymer gel is dried as has been exemplified with FIG. 1. In a fourth step P4 water-absorbing polymer particles retrieved from step P3 can be grinded and classified. In a step P5, optionally the polymer material can be thermally surface postcrosslinked. In a step P6, but also in between the other steps, optionally handling of water absorbing polymer particles in intermediate vessels of silos or stations or the like can be provided.

For further exemplifying in particular step P3 FIG. 2(B) shows a flow chart of a method M of use of a conveyer dryer 100 in a process for drying aqueous water absorbing polymer gel. The method of use provides step M1, wherein the aqueous polymer gel is provided to the circulating plate conveyer belt of the conveyer dryer and the aqueous polymer gel is conveyed on the circulating plate conveyer belt. In step M2 and as exemplified with FIG. 1 the circulating plate conveyer belt is formed as a plate conveyer belt 10 comprising a number of belt plates 1, 2 separated by a hinge line of a hinge assembly and each belt plate 1, 2 has a surface for receiving the polymer gel. In step M3 the plate conveyer belt 10 extends into a flat band, in particular being in a state as depicted for drying stages 100.1 to 100.8 of FIG. 1(A). In this step M3 and upon flattening of the circulating plate conveyer belt 10, a first and a second belt plate 1, 2 are arranged to form a comparably flat surface S. In this elongated situation of a circulating plate conveyer belt, the surface of the circulating plate conveyer belt is rather flat as compared to a curved situation of the circulating plate conveyer belt, when the circulating plate conveyer belt is bent to change direction. Advantageously here a flat surface S extends also across the hinge line 3 or may result in a very small gap.

In a first varied embodiment, forced airflow—as a down-airflow D and/or as an up-airflow A—is adapted to pass through orifices of the plates 1, 2 and/or slits of a hinge line 3 as depicted with FIG. 1. In a preferred varied embodiment upon arranging of the first and second belt plate 1, 2, to form a comparably flat surface S, a slit of a hinge line 3 is closed or covered by a cover means or the like. According to the invention in both embodiments the hinge line is constructed to form a straight hinge line. Thus the hinge is free of line sections directed into the conveying direction C. The hinge, i.e. along the straight hinge line is restricted to a line section only in a transverse direction T. A transverse direction T is indicated in FIG. 1(B1) and FIG. 1(B2) as extending from one side SE1 of a hinge line 3 to a second side SE2 of a hinge line 3 between a first and second belt plate 1, 2.

In a fourth step M4 of the method of drying the circulating plate conveyer belt 10 bends when approaching a first and/or a second end E1, E2 of the conveyer dryer, in particular when situated on a roll R1, R2 for supporting and moving the circulating plate conveyer belt 10. Thus, in particular in step M4 upon bending of the circulating plate conveyer belt 10 a first and a second belt plate 1, 2 are pivoted to each other at the hinge line 3 between the first and the second belt plate 1, 2. A hinge assembly assigned to the first and the second belt plate 1, 2 is adapted to allow pivoting of the belt plates 1, 2 at the hinge line 3. In the embodiment of this application at the straight hinge line 3 a bend-slit is formed.

A slit S according to the concept of a preferred development is understood to be just defined as a gap with a gapwidth which is basically the distance between frontside and backside of neighboring plates. The gap can have a conical or other tapered cross-sectional shape such that still the slit is closed at one end; i.e. one cannot look through the slit. Thus, for a closed slit, the largest width of the gap is defined by a slit width of a slit S. Even in the case the slit is open at both ends the largest width of the opening is defined by a slit width of a slit S. The slit width S thereby is defined to be in particular below a smallest width w of an opening 4, 400 in a plate 1, 2. Thus, in the case the slit S is closed and even if a slit S is open to the surface of a plate (such that one can look through the slit) still nevertheless the slit width is small enough to prevent particles from falling through the slit.

Thus, the slit, however, has a slit width which has a limitation, i.e. the slit width is limited in the bending region of the plate conveyer belt 10—as far as existent—to value which is below a value of an opening width of an opening in a belt plate 1, 2. In particular a slit width can be set such that it is well below a mean value of particle size of dried gel particles; in particular an upper limit of a slit width is well below or at a lower end of a particle distribution with a mean value of particle size of dried gel particles. The limitation of the slit width is such that passing through of polymer particles, in particular aqueous polymer gel particles and/or water-absorbing polymer particles, situated on the surface S is avoided. In particular, it has been found favorable to avoid a slit at all or form a slit width smaller than a width of an orifice or other opening in a belt plate 1, 2 itself. Thereby it can be avoided, that particles pass through a bend-slit in the same way as through an orifice in the belt plate 1, 2. Thereby a first significant contribution is provided to avoid a loss of polymer material from a circulating plate conveyer belt. The amount of waste discharged from the circulating plate conveyer belt is significantly reduced.

In a fifth step M5, preferably in combination with step M4, the bended state of the circulating plate conveyer belt 10 is provided on the outside of a drying stage or zone of the conveyer dryer 100. In particular it has been found advantageous to provide a bended state of the circulating plate conveyer belt 10 outside a housing of a drying stage 100.i, i=1 . . . 9. Thus, a considerable amount of accumulated particles is avoided inside a drying stage itself, which contributes to an effective handling of the drying process. Thus furthermore, the process is not only effective, but actually not disturbed.

Accumulated particles, if at all in very small amounts inside the conveyer dryer, are mainly outside a housing of a drying stage, preferably in a stage for charging or discharging the circulating plate conveyer belt 10, for instance in a stage 100.0 or in a stage 100.9 as depicted in FIG. 1(A). In particular at a front end of the plate conveyer belt 10 a region of the stage 100.0 can easily be cleaned and/or at back end of the plate conveyer belt 10 a region in a stage 100.9 is provided wherein actually the particles can fall right into the discharge together with the regular product. Preferably polymer particles, in particular aqueous polymer gel particles and/or water-absorbing polymer particles, passing through a bend-slit at a straight hinge line 3 between two belt plates 1, 2 upon bending of the circulating plate conveyer belt 10 is situated to be easily recyclable or to be easily forwarded to a product breaker or other kind of further processing device. Thereby, additional effort for removing polymer material waste is diminished at least.

In a further recognition unwanted discharge of polymer material from the circulating plate conveyer belt 10 is strictly avoided by providing a straight hinge line in combination with a closed or at least partially covered or closed hinge slit between a first and a second belt plate 1, 2. Thus, approaching of polymer particles, in particular aqueous polymer gel particles and/or water-absorbing polymer particles, into a slit at the hinge line 3 and/or passing of particles through a slit at the hinge line is safely suppressed; this is particular advantageous for the case of a hinge slit in a flattened state of the plate circulating plate conveyer belt 10 but most preferable for a bend slit in a bended state of the circulating plate conveyer belt 10.

Furthermore, in a preferred embodiment, it has been recognized that an unwanted discharge of polymer particles, in particular unwanted discharge of aqueous polymer gel particles and/or water-absorbing polymer particles, from the circulating plate conveyer belt 10 is supported in an air-down airflow D, but also in an air-up airflow A. Thus, in a sixth step M6 of the drying process, preferably bended states of the circulating plate conveyer belt 10 are combined with an air-up airflow A. At least an air-down airflow D is avoided in a bended state of the circulating plate conveyer belt 10. In a further varied embodiment one and the same drying stage 100.i can be driven in change with an air-up and an air-down airflow A, D from time to time; i.e. changing of air flow direction at the same location with time. This contributes that the amount of waste, if any, is not concentrated at a single stage of the drying line. Thereby maintenance and cleaning cycle times can be extended.

In a step M7 the dried polymer particles are discharged from the circulating plate conveyer belt 10 of the conveyer dryer 100.

FIG. 3 shows in perspective view (A) a preferred example of construction for assembling neighboring first and second belt plates 1, 2 of a circulating plate conveyer belt 10 separated at a straight hinge line 3; which will be further outlined in a detail below. In a particularly preferred embodiment to provide a straight hinge line 3 a hinge is constructed as a pinless hinge 303 of a hinge assembly 300. The pinless hinge is formed as a part of a knuckle joint 330 forming the straight hinge line 3.

In the instantly preferred embodiment and as shown further in view (A) of FIG. 3 the hinge assembly 300 further is provided with a truss or the like reinforcement means 340 which strengthens a belt plate 1, 2 also for heavy loading and/or eliminates at least distortions of the belt plates 1, 2. Basically also further reinforcement means 350 of the belt plates can be oriented in direction C of conveying; the further reinforcement means 350 here are shown through a cut out section of the first plate 1. The plates 1, 2 preferably have openings 4 which in this case are preferred to be elongated openings 400 as shown in the preferred embodiment of FIG. 4.

In the instant embodiment the circulating plate conveyer belt 10 is provided with a travelling side wall 320 which functions as a travelling material guard to prevent polymer particles, in particular unwanted discharge of aqueous polymer gel particles and/or water-absorbing polymer particles, falling off the circulating plate conveyer belt 10 at the side ends SE1, SE2 (not shown) thereof. A travelling sidewall 320 extends at both side ends SE1, SE2 along the conveying direction C along a belt plate's 1, 2 side. The travelling material guard in this embodiment is fixed to the belt plate 1, 2 itself, for instance, by means of screws or bolts or the like means which can be anchored into holes of the side walls 320 and the belt plates 1, 2 at the side end SE1, SE2 respectively. Welding or some other kind of joining is also possible alternatively or additionally. The side guards also have the purpose to be part of a sealing against air bypassing the belt plates.

In a varied embodiment also the side walls 320 can be fixed or anchored together with the belt plates 1, 2 on a traction assembly line 310, which is shown in an exploded view in the lower part of view (A) of FIG. 3. In this embodiment the traction assembly line 310 forms a heavy duty chain, like a catenary, in gear with a drive and/or the rolls R1, R2 of FIG. 1. Also in this embodiment the traction assembly line 310 is adapted for supporting the plate 1, 2 and/or the side walls 320 as indicated above.

The traction assembly line 310 in this embodiment provides guide bars 313 for holding rollers 314. A number of first and second connection parts 311, 312 can be provided to form a guide chain, which are shown only schematically in this embodiment. Each connection part 311, 312 is assigned to one of the first and second belt plates 1, 2. Each connection part may have a first bar respectively and a second bar respectively. The first bar extends along the conveying direction and the second bar extends vertical to the conveying direction C. This provides a two-axis connection assembly 315 for supporting the first and second belt plates 1, 2. It should be mentioned that the second bars are helpful but not necessary; theses could be omitted (to have a one-axis connection assembly only) or replaced with bars from the belt plates 1, 2 or the like to provide a modified two-axis connection assembly 315. The circulating plate conveyer belt 10 with the hinge assembly 300 and reinforcement 340, 350 with the side walls 320 and traction assembly line 310 is shown in an exploded view in FIG. 3 view (A). FIG. 3 view (B) shows these parts in a nearly assembled view respectively for a circulating plate conveyer belt 10 from a side end SE1 perspective of view of the circulating plate conveyer belt 10 allowing a truss direction transverse to the conveying direction.

As shown in a side view (B) of FIG. 3 schematically in particular, the hinge assembly 300 further comprises first and second extensions 301, 302 of the first and second belt plates 1, 2 which are adapted to overlap at least partially and basically close the slit S at the knuckle joint 330 along the straight hinge line 3. The first extension 301 is formed as a kind of roundish bearing bar and the second extension 302 is formed as an elongation in the plate's plane. In the second plate's plane on the back side 306 of the second plate 2 an upper plate side elongation 302.1 and a lower plate side elongation 302.2 on the second plate 2 provide a groove 304 for receiving a front side 305 of the first plate 1.

As shown the hinge assembly 300 in a side view (C) of FIG. 3 schematically in particular the overlap of the extensions 301, 302 at least partially diminishes the width of the slit S to a value below an upper limit of slit width for avoiding trespassing of polymer particles, in particular for avoiding trespassing of aqueous polymer gel particles and/or water-absorbing polymer particles, there through. The knuckle joint 330 of the hinge assembly as such is adapted to pivotal couple the first and second plate 1, 2 in the region of the hinge line 3. In particular elongations of the overlapping first and second extensions 301, 302 of the first and second belt plate 1, 2 can be used to form the knuckle joint 330 for pivotal coupling of the first and second plate 1, 2.

In particular, the straight hinge line 3 of the pinless hinge 303 of a hinge assembly 300 of FIG. 3 is free of line sections into the conveying direction C and thus is in particular free of any prior art piano type line sections 503C (as exemplified in FIG. 5). Thus according to the concept of the invention in the instant embodiment there is only a transverse direction, in this embodiment vertical, direction of the straight hinge line 3 at the pinless hinge 303.

As shown in the piano type hinge assembly 500 of FIG. 5 the piano type conveying line sections 503C depart from a piano type traverse hinge line section 503L in the transverse direction of the hinge line 503 in the piano type hinge assembly 500 between a first plate 501 and a second plate 502. Consequently, as seen best at the gap G near the crossing of the piano type traverse hinge line sections 503L and the piano type conveying line sections 503C in FIG. 5 a hinge opening remains which allows to pass through particles with the disadvantages mentioned above.

In particular it has shown up for the instant embodiment of a straight hinge line 3 according to the concept of the invention that the slit of the hinge line 3 shows up to be a somewhat self-cleaning hinge. In particular as shown in FIG. 3 in view (C) it shows up that a first end E1 of line of the conveying dryer 100—i.e. when a circulating plate conveyer belt is moved up from a lower region of the conveyer dryer 100 to an upper region of the conveyer dryer 100—allows to remove polymer particles, in particular to remove aqueous polymer gel particles and/or water-absorbing polymer particles, from the hinge line 3 under gravitational force. Thus reliable bending of the circulating plate conveyer belt 10 at the hinge line 3 is possible without complication on a long term time scale process of drying. This diminishes also maintenance work at the drying line.

Further as shown in view (C) of FIG. 3 at a second end E2 of line of the conveying dryer 100, i.e. when the plate conveyer belt 10 is moved down from an upper region of the conveyer 100 to a lower region of the conveyer dryer a small width of the slit S still is below an upper limit of slit width for avoiding trespassing of polymer particles, in particular avoiding trespassing of aqueous polymer gel particles and/or water-absorbing polymer particles, there through even when the plate conveyer belt 10 is bended such that the first and second plate 1, 2 have an angle to each other. Still here the extensions 301, 302 cover practically all of the width of the slit S. Even more, as shown in the upper part of the plate conveyer belt 10—before bending the first and second plate 1, 2—are forming a comparably flat surface and here the straight hinge line 3 is practically free of any slit. In this elongated situation of a circulating a circulating plate conveyer belt, the surface of the circulating plate conveyer belt is rather flat as compared to a curved situation of the circulating plate conveyer belt, when the circulating plate conveyer belt is bent to change direction. Consequently, dried polymer particles, in particular water-absorbing polymer particles, refrain from being passed into the slit S even at a second end E2 of the plate conveyer belt 10.

FIG. 3 shows in view (D) an alternative embodiment of a plate conveyer belt 10' of a conveyer dryer 100' with a first and a second belt plate 1', 2'. The conveyer belt plates 1', 2' are adapted according to the concept of the invention in a varied form. In this case, the second belt plate 2' has an upper plate side elongation 302.1' and a lower plate side elongation 302.2'. Thus, the back side 306' of the second plate 2' provides a groove 304' for receiving a front side 305' of the first plate 1'; here in view (D) the groove 304' is of circular cylindric form unlike the rectangular cylindric form of groove 304 in view (B). Also here a straight hinge line 3' is formed with only a small slit S at least partially covered such that a slit width at most is smaller than an opening width of openings in a belt plate 1', 2'. Also the alternative embodiment of belt plate 1', 2' with groove 304' and straight hinge line 3' and the like varied embodiments can be used in the further described embodiments.

Figures 3B, 3C, 3D:
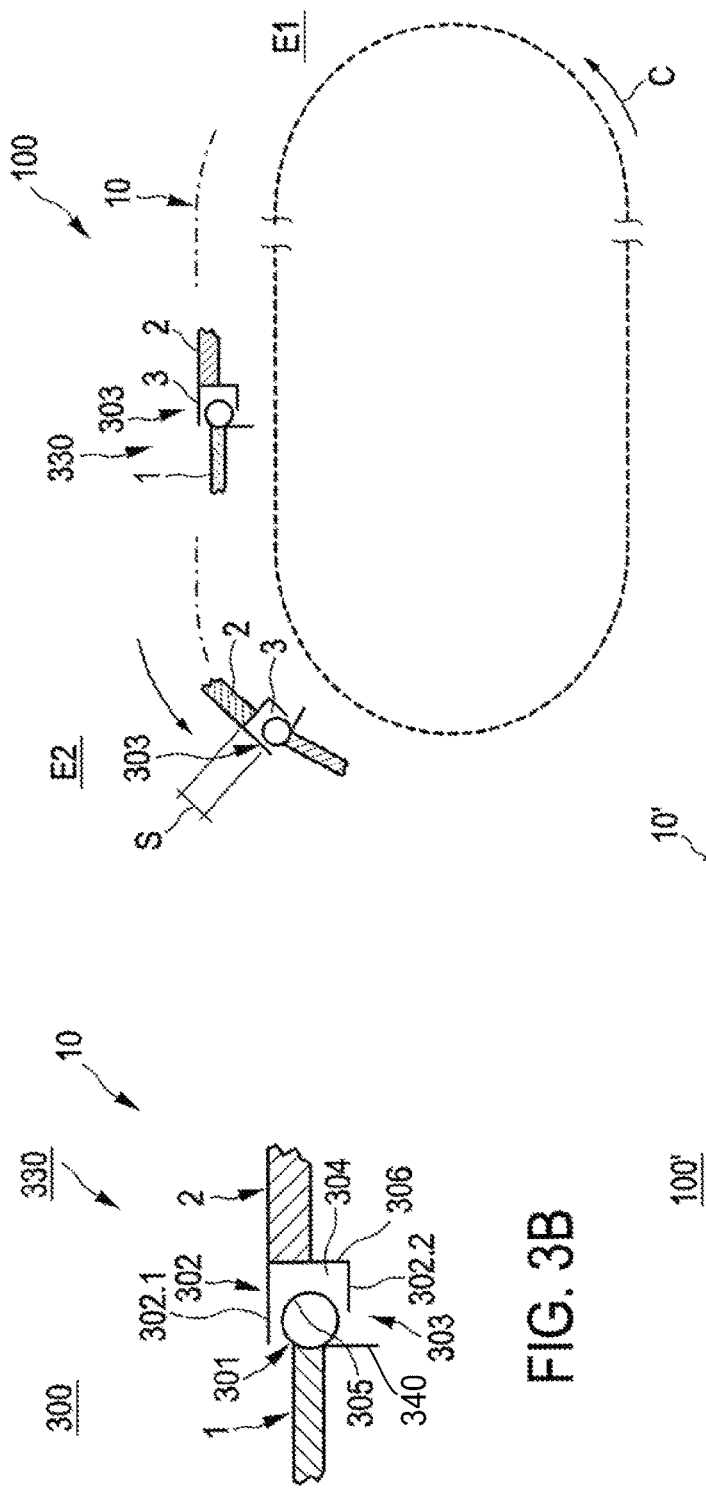

FIG. 4 shows in a front view (A) and in a side view (B) of same perspective as in FIG. 5 a first and a second belt plate 1 and 2 respectively with a straight hinge line 3 therebetween. In this embodiment as shown in view (A) the first and second plate are bended in an angle to each other such that a small part of a first plate's extension 301 is visible. Still nevertheless, no slit S opens up to the surface when the first and second plate 1, 2 are bended to each other; i.e. one cannot look through hinge at the hinge line 3 even in the bended state. Respectively even in the case a slit S evolves upon bending—that is to say the gap between the backside 305 and front side 306 of neighboring plates 1, 2—such slit S (as best shown in FIG. 3C and FIG. 4A) is covered by the upper plate side elongation 302.1 of the extension 302 to allow only for a slit width which is well below an opening width w of openings 400 in the plates. In this embodiment, as shown in FIG. 4 in view (A), the openings 400 are formed as elongated orifices with an elongation part 401 of length l>w and round end parts 402, 403. Thus, even when the bending of the first plate 1 relative to the second plate 2 is increased a width of slit S would be smaller than a width w of opening 400 in a belt plate 1, 2. In particular the slit width of slit S is limited in the bending region of the circulating plate conveyer belt 10 to a value which is well below a mean value of particle size of dried gel particles; in particular an upper limit of a slit width w can be in the range of or below a particle size form a lower end of size particle distribution, i.e. well below a mean value of particle size of dried gel particles.

The same belt plates 1, 2 in a direct front view from a perspective against the conveying direction as shown in FIG. 4 view (A) allow a direct view into the knuckle joint 330 with a straight hinge line 3 and a first extension 301 at a first plate's front side, thus reducing the width of slit in the knuckle joint. Still nevertheless one cannot look through hinge at the hinge line 3 even in the bended state at an end of the conveyer dryer 100.

At the second end E2 of a conveyer dryer 100 with water-absorbing polymer particles P conveyed on the circulating plate conveyer belt 10 the particles P are provided as a dried cake. The cake falls down to a crusher as shown as product breaker 20 in FIG. 1 below the circulating plate conveyer belt 10 in a cage of the conveyer dryer provided in the discharge stage 100.9 of FIG. 1.

EXAMPLES

Example 1, Comparative Example

Production of postcrosslinked superabsorbent, i.e. water-absorbing, polymer particles from a crosslinked aqueous polymer gel, in particular according to the above mentioned developments, by using a piano type hinge between two plates in circulating plate conveyer belt dryer It has been found that, within 6 months, approximately 30 tons of waste fall off the plate conveyer belt and accumulated underneath the dryer belt at different positions within the dryer as well as at the front end of the dryer where the conveyer belt turns up to receive new polymer material.

Example 2, Inventive Example

Production of postcrosslinked superabsorbent, i.e. water-absorbing, polymer particles from a crosslinked aqueous polymer gel, in particular according to the above mentioned developments, by using an inventive straight line type hinge between two plates of a circulating plate conveyer belt of a conveyer belt dryer.

It has been found that some waste in a significantly lower amount of about 2-3 tons every 6 months, if any, is accumulated underneath the belt at different positions. There might be more at the front end of the dryer where the circulating plate conveyer belt turns up, but outside a drying stage of a multi-stage conveyer dryer. But as mentioned above, this accumulating material does not disturb the process and can be removed during running operation.

In summary the plate conveyer belt 10 of the type shown and described in this application, has found to be particularly advantageous and useful in a process for producing water absorbing polymer particles, in particular in a process for drying aqueous polymer gel for providing water absorbing polymer particles and which allows a particular more efficient process, in particular by diminishing the amount of waste and extending maintenance cycle times. As described with the figures in particular a combination of a first aspect of the inventive concept—namely an inventive type of closed or partially closed, at least tight knuckle joint with a straight hinge line—is combined with a second aspect of the inventive concept of providing a first and/or second end E1, E2 of the plate conveyer belt 10 in a bended state outside a drying stage 100.i, in particular outside a housing of a drying stage 100.1 (i=1 . . . 9).

The invention claimed is:

1. A process for producing water-absorbing polymer particles, comprising:
    processing an aqueous polymer gel from polymerization of a monomer solution or suspension,
    drying the aqueous polymer gel in a conveyer dryer, wherein
    the conveyer dryer has a circulating conveyer belt and the aqueous polymer gel is conveyed on the circulating conveyer belt, and wherein
    the circulating conveyer belt is formed as a circulating plate conveyer belt, comprising a number of belt plates separated by a hinge line of a hinge assembly and each belt plate having a surface for receiving the aqueous polymer gel,
    wherein
    said hinge assembly comprises a knuckle joint with the hinge line in form of a straight hinge line, and
    a separate circulating plate conveyer belt in form of the circulating plate conveyer belt is assigned to a drying zone of the conveyer dryer and wherein the separate circulating plate conveyer belt has a first return end and a second return end wherein the first and/or second return end is located outside of the drying zone.

2. The process of claim 1 wherein the plates are neighbored along the conveying direction of the circulating plate conveyer belt and the straight hinge line extends transverse to the conveying direction.

3. The process of claim 1 wherein when circulating the circulating plate conveyer belt, upon bending of the circulating plate conveyer belt, a first and a second belt plate of the plates are pivoted to each other at the hinge line between the first and the second belt plate by means of the hinge assembly assigned to the first and the second belt plate.

4. The process of claim 1 wherein upon flattening of the circulating plate conveyer belt, the first and the second belt plate are arranged to form a flat surface and at the straight hinge line a hinge slit is formed having a slit width wherein the slit width is smaller than an opening width of openings in a belt plate, and/or upon pivoting the first and the second belt plate to each other at the straight hinge line a bend slit is formed having a slit width wherein the slit width is smaller than an opening width of openings in a belt plate.

5. The process of claim 1 wherein upon bending of the circulating plate conveyer belt a bend slit of the straight hinge line is closed or at least partially covered, and/or when circulating the circulating plate conveyer belt, upon flattening of the circulating plate conveyer belt, the first and the second belt plate are arranged to form a flat surface across the hinge line, and wherein upon arranging of the first and the second belt plate to form a flat surface, the straight hinge line is closed or at least partially covered.

6. The process of claim 1 wherein the knuckle joint comprises overlapping first and second extensions of the first and second belt plate.

7. The process of claim 1 wherein the first and second belt plate are pivotal coupled to each other at the hinge line by means of overlapping first and second extensions or elongations of the first and/or second belt plate.

8. The process of claim 1 wherein the plate has one or more reinforcing ribs and/or one or more reinforcing trusses.

9. The process of claim 1 wherein the circulating plate conveyer belt has a traction assembly line in gear with a drive and/or adapted for supporting the plates.

10. The process of claim 1 wherein a traction assembly line has a number of traction elements wherein the first and/or second plate is assigned to a first one and/or a second one of the traction elements.

11. The process of claim 10 wherein the traction assembly line is in form of a chain of traction elements.

12. The process of claim 11 wherein at least one of the traction elements of the number of elements of the traction assembly line provides a first and/or a second connection part connected to a single plate.

13. The process of claim 12 wherein the first connection part to the plate extends along the conveying direction and/or the second connection part to the plate extends crosswise to the conveying direction.

14. The process of claim 1 wherein a traction assembly line supports a traveling side wall extending along the conveying direction along a belt plate's side.

15. The process of claim 1 wherein
the conveyer dryer is a forced-air conveyer dryer in form of a multiple-stage belt-dryer comprising more than a single-stage wherein
at least one drying stage of the belt-dryer is an air-down stage, wherein drying-air is passed from an upper region above the circulating plate conveyer belt to a lower region below the circulating plate conveyer belt.

16. The process of claim 1 wherein a first return end and/or a second return end is located outside a drying zone's housing.

17. The process of claim 1 wherein the aqueous polymer gel is processed from the polymerization of a monomer solution or suspension, the monomer solution or suspension comprising:
at least one ethylenically unsaturated monomer optionally bearing an acid group and optionally being at least partly neutralized;
at least one crosslinker;
at least one initiator;
optionally one or more ethylenically unsaturated monomer copolymerizable with the monomer mentioned under (a) and
optionally one or more water soluble polymer.

18. The process of claim 1 wherein the process further comprises:
grinding and classifying the resulting water-absorbing polymer gel particles,
optionally thermally surface postcrosslinking,
optionally handling water-absorbing polymer particles in intermediate vessels of silos or stations.

19. A conveyer dryer comprising
a circulating conveyer belt wherein
the circulating conveyer belt is formed as a circulating plate conveyer belt, comprising a number of belt plates separated by a hinge line of a hinge assembly and each belt plate having a surface, wherein
said hinge assembly comprises a knuckle joint with the hinge line in form of a straight hinge line, and
a separate circulating plate conveyer belt in form of the circulating plate conveyer belt is assigned to a drying zone of the conveyer dryer and wherein the separate circulating plate conveyer belt has a first return end and a second return end wherein the first and/or second return end is located outside of the drying zone.

20. The conveyer dryer of claim 19, wherein the first and the second belt plate are arranged at a straight hinge line and a hinge slit is formed having a slit width wherein the slit width is smaller than an opening width of openings in a belt plate.

21. The conveyer dryer of claim 19, wherein a first return end and/or a second return end is located outside a drying zone's housing.

* * * * *